United States Patent
Kurono et al.

(10) Patent No.: US 10,439,466 B2
(45) Date of Patent: Oct. 8, 2019

(54) FIXTURE, FIXING ASSEMBLY, AND FIXATION METHOD FOR FIXING POWER LINE TO BASE MEMBER

(71) Applicant: TOYOTA JIDOSHA KABUSHIKI KAISHA, Toyota-shi, Aichi-ken (JP)

(72) Inventors: Yousuke Kurono, Okazaki (JP); Yasuhiro Makido, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 289 days.

(21) Appl. No.: 15/285,917

(22) Filed: Oct. 5, 2016

(65) Prior Publication Data

US 2017/0104384 A1    Apr. 13, 2017

(30) Foreign Application Priority Data

Oct. 7, 2015    (JP) .................................. 2015-199270

(51) Int. Cl.
*H02K 5/22*    (2006.01)
*H02K 3/50*    (2006.01)
*H02K 15/00*   (2006.01)
*H02G 3/32*    (2006.01)

(52) U.S. Cl.
CPC .............. *H02K 5/225* (2013.01); *H02K 3/50* (2013.01); *H02G 3/32* (2013.01); *H02K 15/0062* (2013.01)

(58) Field of Classification Search
CPC ...... H02K 3/50; H02K 5/225; H02K 15/0062; H02K 15/0068; H02K 15/14; H02K 2203/06; H02K 2203/09; H01R 9/24; H01R 9/2416; H01R 9/26; H01R 9/2608
See application file for complete search history.

(56) References Cited

U.S. PATENT DOCUMENTS

| 3,894,706 A | 7/1975 | Mizusawa |
| 5,762,507 A * | 6/1998 | Mochizuki ........... H01R 35/025 439/15 |
| 2005/0118886 A1* | 6/2005 | Cha ...................... H01R 4/185 439/810 |
| 2014/0339937 A1* | 11/2014 | Tokunaga .............. H02K 5/225 310/71 |

FOREIGN PATENT DOCUMENTS

| CN | 104253503 A | 12/2014 |
| CN | 204216711 U | 3/2015 |
| DE | 102013212041 A1 | 1/2015 |

(Continued)

OTHER PUBLICATIONS

U.S. Appl. No. 16/202,286, filed Nov. 28, 2018, Yousuke Kurono.

*Primary Examiner* — Peter Dungba Vo
*Assistant Examiner* — Joshua D Anderson
(74) *Attorney, Agent, or Firm* — Sughrue Mion, PLLC

(57) ABSTRACT

A fixture for fixing, to a motor case, a holding jig configured to hold a plurality of power lines connected to respective stator coils so as to restrict a relative movement between the plurality of power lines includes: a fastening hole through which a bolt for fastening the fixture to a motor case is inserted; and a mounting portion on which the holding jig holding the power lines is mountable. The mounting portion includes: an accommodation space in which to accommodate the holding jig; and holding pawls for sandwiching the holding jig.

10 Claims, 9 Drawing Sheets

(56) References Cited

FOREIGN PATENT DOCUMENTS

| | | |
|---|---:|---:|
| JP | 1-69373 U | 5/1989 |
| JP | 6-80363 U | 11/1994 |
| JP | 2005-318726 A | 11/2005 |
| JP | 2007-068259 A | 3/2007 |
| JP | 2009-108837 A | 5/2009 |
| JP | 2014-128095 A | 7/2014 |

\* cited by examiner

FIXTURE, FIXING ASSEMBLY, AND FIXATION METHOD FOR FIXING POWER LINE TO BASE MEMBER

CROSS-REFERENCE TO RELATED APPLICATIONS

This application claims priority from Japanese Patent Application No. 2015-199270 filed on Oct. 7, 2015, the disclosure of which, including the specification, drawings and abstract, is incorporated herein by reference in its entirety.

BACKGROUND

1. Technical Field

The present disclosure relates to a fixture, a fixing assembly, and a fixation method each for fixing, to a base member, a power line connected to a rotary electric machine.

2. Description of Related Art

Conventionally, there has been known an in-vehicle rotary electric machine provided in an electrically driven vehicle such as a hybrid vehicle or an electric vehicle. A power line for supplying an electric power from a power source is connected to such a rotary electric machine. Generally, one end of the power line is connected to a stator coil, and the other end of the power line is connected to a terminal block attached to a motor case. Further, in most cases, a power-line-side terminal is attached to the other end of the power line, and the power-line-side terminal is fastened, by a bolt, to a bus bar provided in the terminal block.

Here, in a case of a rotary electric machine including a three-phase stator coil like a three-phase motor, power lines are provided for three phases, namely, three power lines are provided. In order to fix relative positions of the three power lines, it has been conventionally proposed to use a member (a holding jig) for holding the three power lines (for example, Japanese Patent Application Publication No. 2014-128095 (JP 2014-128095 A)). When a relative positional relationship between the three power lines is fixed with the use of such a holding jig, it is possible to reduce troubles of positioning the power lines.

SUMMARY

However, in the conventional configuration, although the three power lines are held by the holding jig, the holding jig itself is in a floating state in the air. If the holding jig receives a vibration or the like and swings around or moves, a stress is applied to a fastening part (a caulking portion) between the power line and the power-line-side terminal or a fastening part (a welded portion) between the power line and the stator coil, which may deteriorate these fastening parts.

In view of this, it is conceivable to fix, to the base member, the power line together with the holding jig so as to restrict its movement. However, in a case where a fastening portion for fixing the power line to the base member is provided in the holding jig, the holding jig is upsized such that the size of the holding jib is increased. This causes an increase in cost of the holding jig. Further, in a case where the holding jig is upsized or increased in weight, a load to the power line at the time of an assembling operation of the power line increases, which deteriorates assembly workability of the power line. Further, a large swing that causes deterioration of the fastening parts does not occur in all vehicles and rotary electric machines, so it is wasteful to provide the fastening portion in all holding jigs.

In view of this, the present disclosure provides a fixture, a fixing assembly, and a fixation method each of which is able to prevent upsizing of a holding jig itself and to fix, to a base member, a power line together with a holding jig as needed.

A first aspect of the present disclosure is a fixture for fixing a holding jig to a base member, the holding jig being configured to hold a plurality of power lines connected to respective stator coils and to restrict a relative movement between the power lines, and the fixture includes a fastening portion to be fastened to the base member; and a mounting portion on which the holding jig holding the power lines is mounted. The fixture according to the aspect of the present disclosure can be externally mounted on the holding jig, thereby making it possible to prevent upsizing of the holding jig itself and to fix, to the base member, the power lines together with the holding jig as needed.

In the fixture of the first aspect, an accommodation space in which to the mounting portion defines accommodate the holding jig, the mounting portion including holding pawls. The holding pawls are provided on both sides of the mounting portion across the accommodating space in at least one of a first direction and a second direction and the holding pawls are configured to sandwich the holding jig accommodated in the accommodation space. The fixture according to the first aspect of the present disclosure is provided with the holding pawls that sandwich the holding jig. Accordingly, it is possible to mount the holding jig by one-touch action.

In this case, it is preferable to include additional holding pawls such that a plurality of holding pawls is provided on either side of the mounting portion across the accommodating space in the first direction, the first direction be perpendicular to the second direction, and a length of the accommodation space in the first direction be shorter than a length of the accommodation space in the second direction. Since the fixture according to the first aspect of the present disclosure is provided with the plurality of holding pawls on either side of the accommodation space, even if some of the holding pawls are curved, it is possible to prevent a sudden decrease in a contact area with the holding jig.

Further, in this case, it is preferable that: the mounting portion further include guide pawls such that the guide pawls extend in parallel with the holding pawls and be longer than the holding pawls, and the guide pawls be configured to guide the holding jig to the accommodation space. With such a configuration, it is possible to simplify a mounting operation of the holding jig. Further, in this case, it is preferable that the holding pawls be provided at different positions in the second direction of the accommodation space. The fixture according to the first aspect of the present disclosure can avoid intensive application of a stress received from the holding pawls.

In the fixture according to the first aspect of the present disclosure, the mounting portion further includes a fitting portion formed as either one of a projection portion and a recessed portion, and the fitting portion is configured to be fitted to a fitted portion that is provided in the holding jig and is formed as a projection portion or a recessed portion so as to correspond to the fitting portion. In the fixture according to the first aspect of the present disclosure, a contact area between the holding jig and the fixture increases, thereby making it possible to disperse the stress applied to the holding jig.

In this case, it is preferable that: in the first direction, a fitting degree between the fitting portion and the fitted portion be higher than a fitting degree between the holding pawls and the holding jig, and in the second direction, the fitting degree between the holding pawls and the holding jig be higher than the fitting degree between the fitting portion and the fitted portion. With the fixture according to the first aspect of the present disclosure, it is possible to improve mounting workability of the holding jig and to more surely reduce an unexpected movement of the holding jig with respect to the fixture.

Further, in this case, it is preferable that: the mounting portion includes a plurality of the fitting portions; and a fitting degree of a main fitting portion, which is a fitting portion closer to the fastening portion among the fitting portions, be higher than a fitting degree of a secondary fitting portion, which is the other fitting portion among the fitting portions. With the fixture according to the first aspect of the present disclosure, it is possible to absorb some variations in accuracy and to improve mounting workability of the holding jig.

In the fixture according to the first aspect of the present disclosure, the fixture has through-holes, the through-holes are positioned right above respective barb portions of the holding pawls, the through-holes each has a generally square U-shaped section, and the barb portions of the holding pawls are provided in respective distal ends of the holding pawls and projects inwardly in the accommodation space. In the fixture according to the first aspect of the present disclosure, it is possible to visually check an engaged state between the holding jig and the holding pawls. Further, it is possible to manufacture the fixture according the aspect of the present disclosure with the use of a core that maintains accuracy and strength while being thin.

According to the first aspect of the present disclosure, the fixture further includes an insulating wall, the insulating wall is configured to be provided between the power lines that projects from the holding jig mounted on the mounting portion. With the fixture according to the first aspect of the present disclosure, it is possible to more surely secure insulation between the power lines.

A second aspect of the present disclosure is a fixing assembly for fixing, to a base member, a plurality of power lines connected to respective stator coils, and the fixing assembly includes a holding jig configured to hold the power lines and to restrict a relative movement between the plurality of power lines; and a fixture including a fastening portion to be fastened to the base member, and a mounting portion configured such that the holding jig holding the power lines is mounted on the mounting portion. In the fixing assembly according to the second aspect of the present disclosure, the fixture can be externally mounted on the holding jig, thereby making it possible to prevent upsizing of the holding jig itself and to fix, to the base member, the power lines together with the holding jig as needed.

A third aspect of the present disclosure is a fixation method of power lines, and the fixation method includes holding a plurality of power lines by a holding jig so as to restrict a relative movement between the power lines; connecting each of the power lines to a corresponding stator coil and a corresponding terminal of a terminal block; mounting the holding jig on a fixture, the holding jig holds the plurality of power lines, the fixture including a mounting portion and a fastening portion, the holding jig being mounted on the mounting portion, and the fastening portion being fastened to a base member; and fastening, to the base member, the fastening portion of the fixture on which the holding jig is mounted. In the fixation method according to the third aspect of the present disclosure, the fixture can be externally mounted on the holding jig, thereby making it possible to prevent upsizing of the holding jig itself and to fix, to the base member, the power lines together with the holding jig as needed.

According to the above aspects of the present disclosure, it is possible to externally mount the fixture on the holding jig, thereby making it possible to prevent upsizing of the holding jig itself and to fix, to the base member, the power lines together with the holding jig as needed.

BRIEF DESCRIPTION OF THE DRAWINGS

Exemplary embodiments will be described below with reference to the accompanying drawings, in which like numerals denote like elements, and wherein.

DETAILED DESCRIPTION OF EMBODIMENTS

Figure 1:
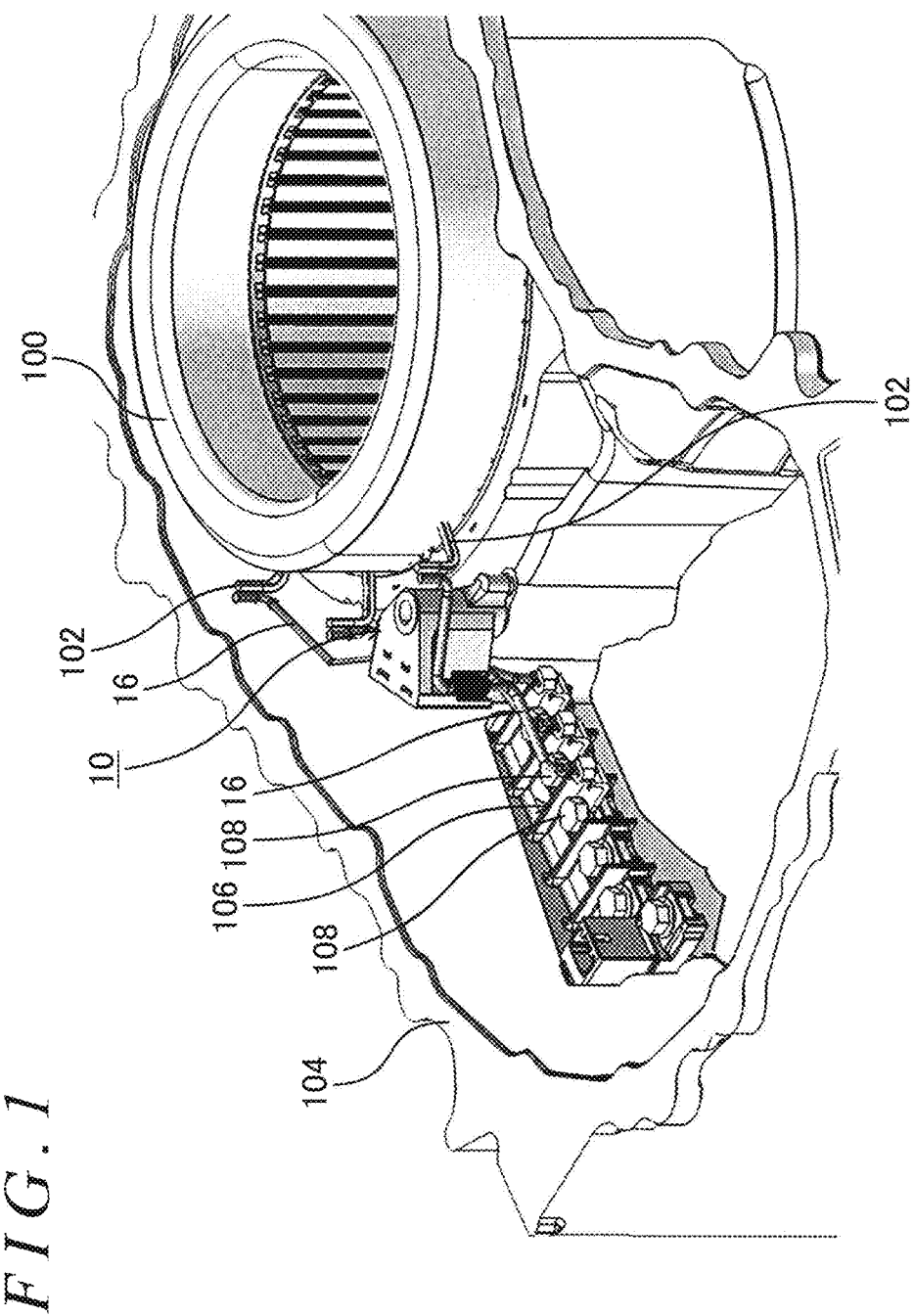
FIG. 1 is a view illustrating a state where power lines are fixed by use of a fixing assembly.
Figure 2:
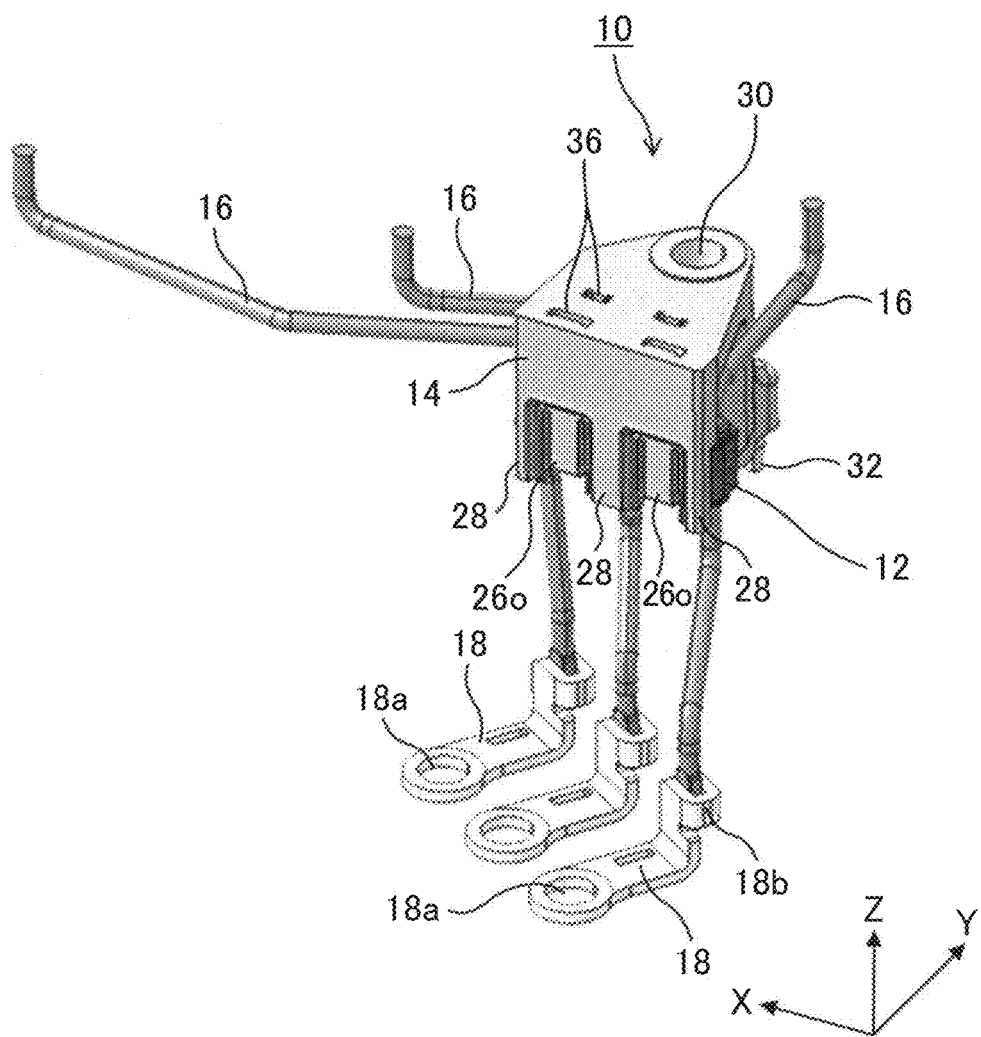
FIG. 2 is a perspective view of the fixing assembly.
Figure 3:
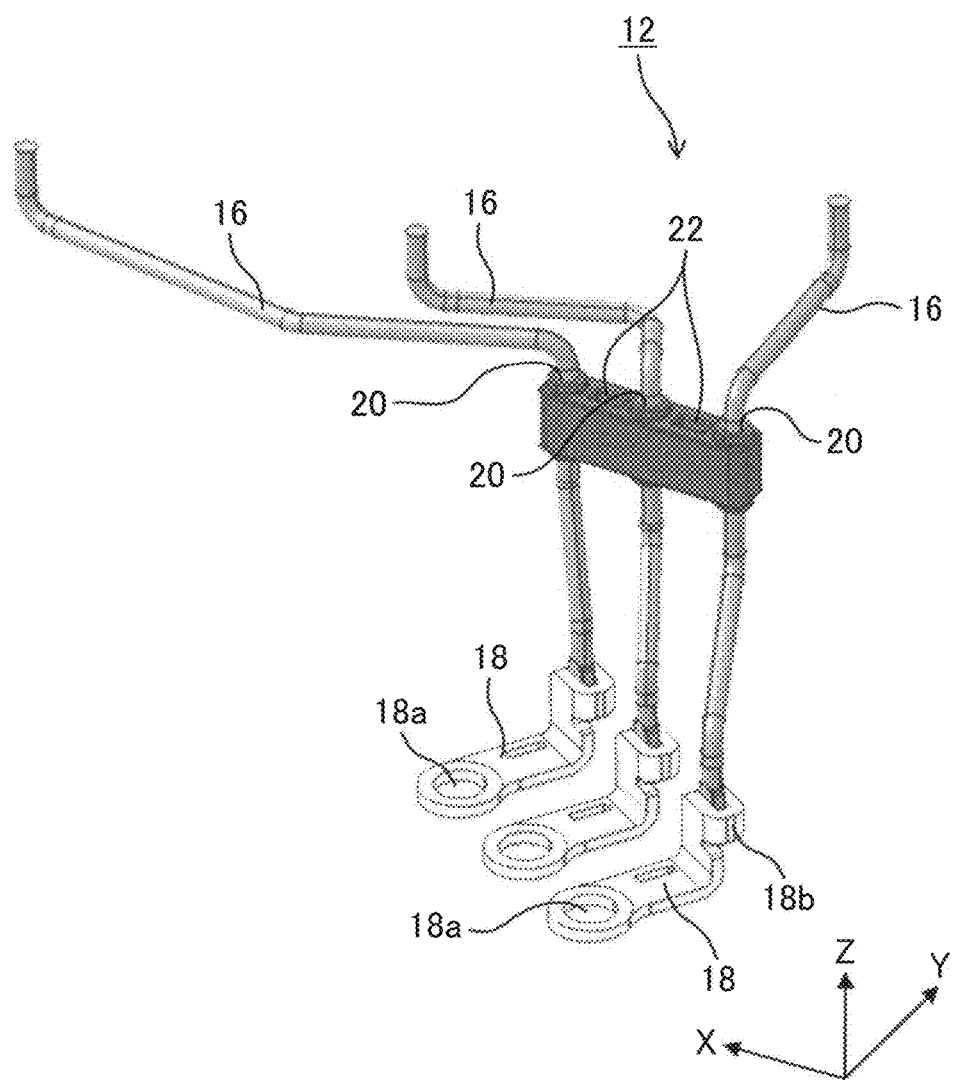
FIG. 3 is a perspective view of a holding jig.
Figure 4:
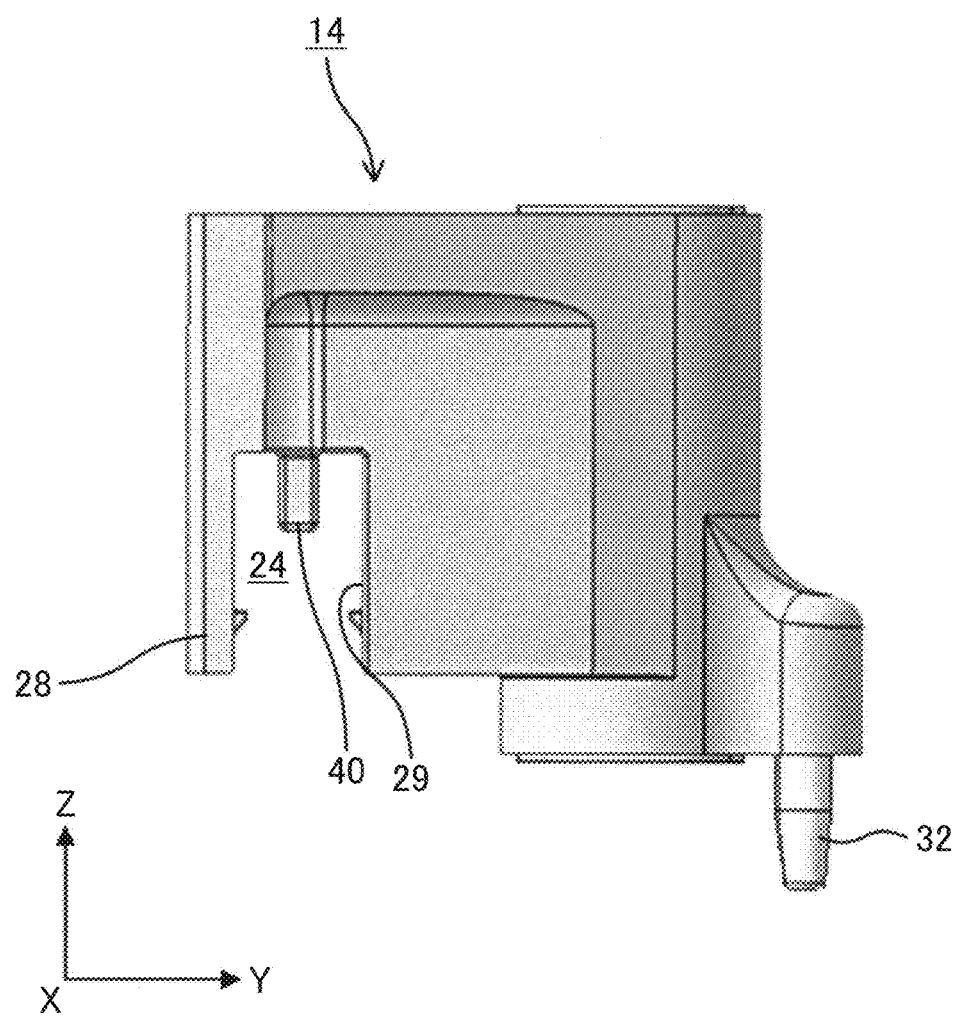
FIG. 4 is a side view of a fixture.
Figure 5:
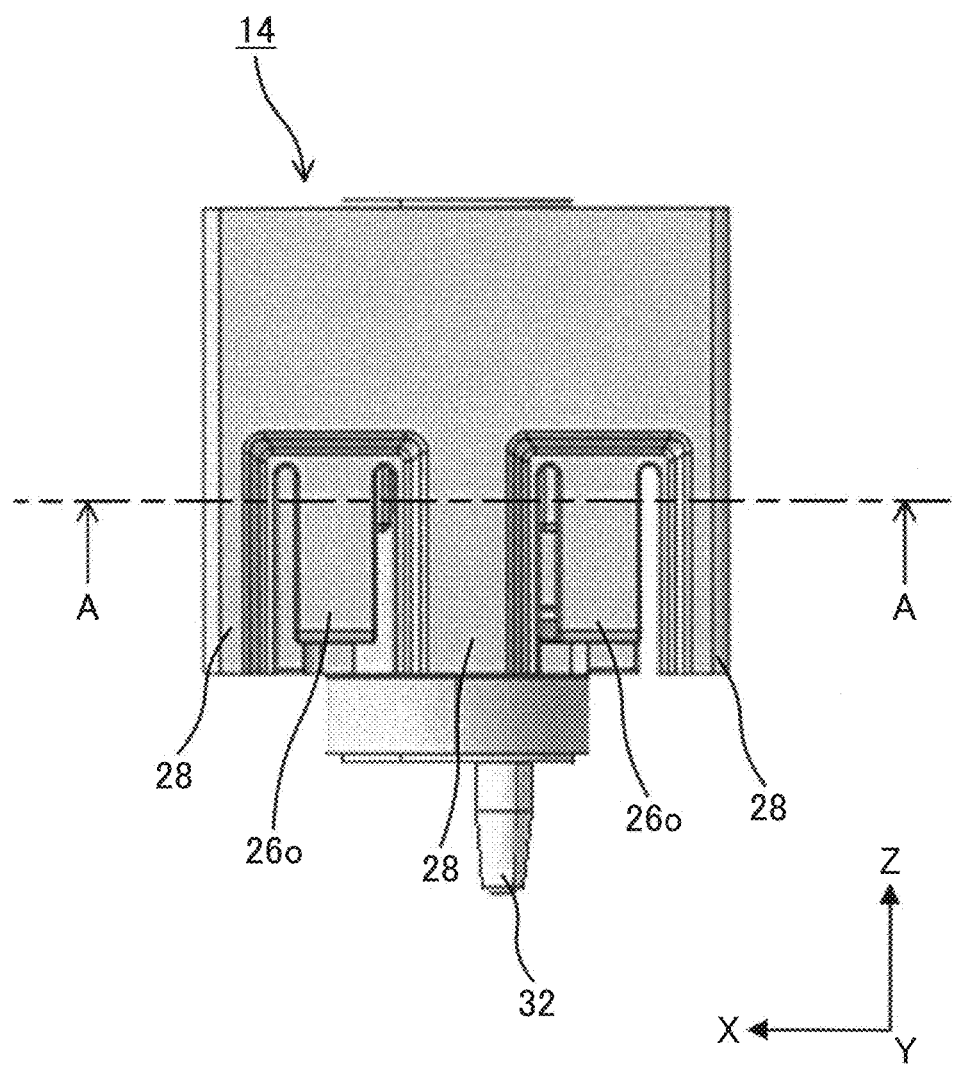
FIG. 5 is a front view of the fixture.
Figure 6:
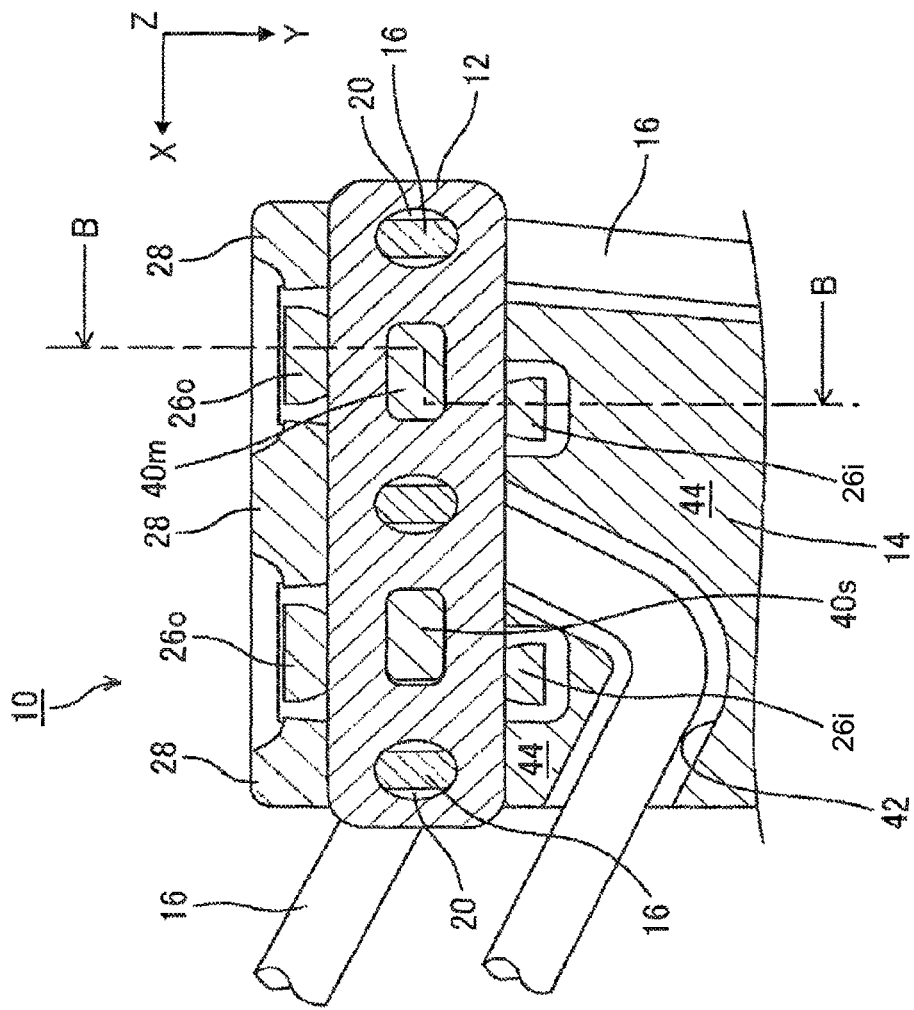
FIG. 6 is a sectional view of a fixing assembly 10 taken along a line A-A in FIG. 5.
Figure 7:
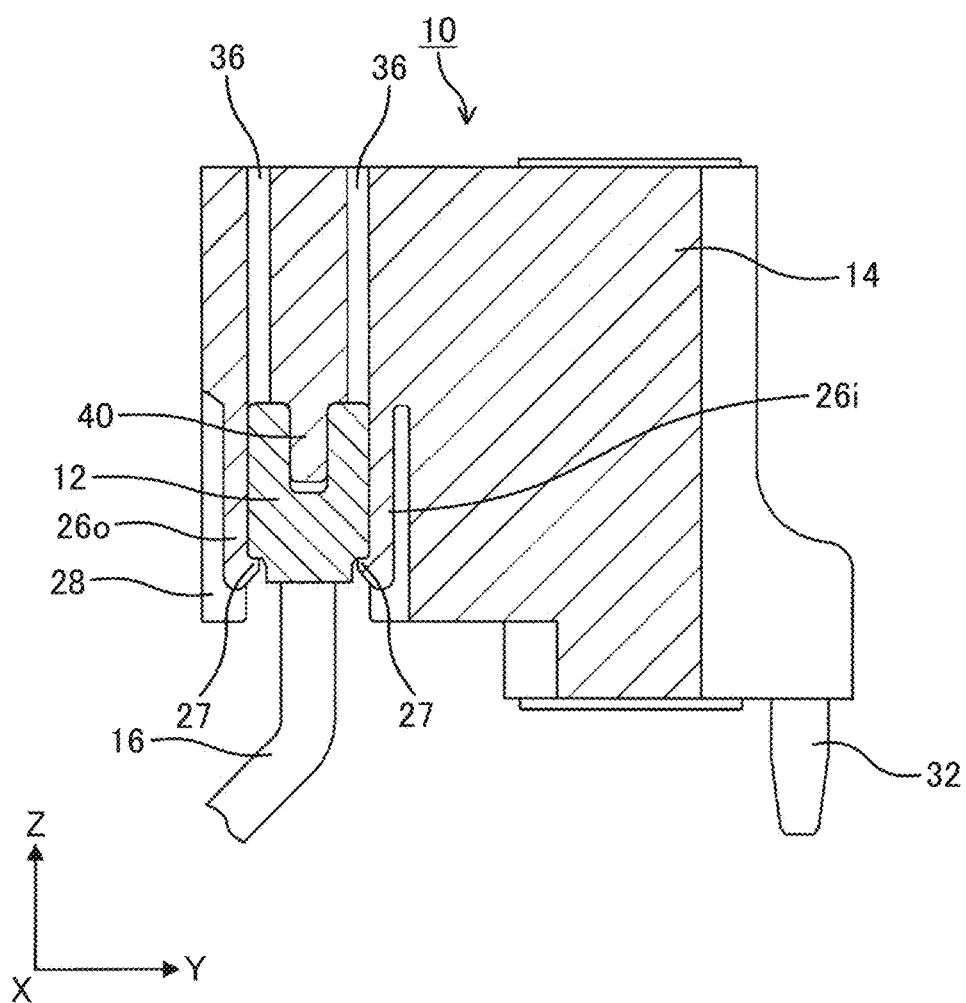
FIG. 7 is a sectional view taken along a line B-B in FIG. 6.

Exemplary embodiments will be described below with reference to drawings. FIG. 1 is a view illustrating a state where power lines 16 are fixed by use of a fixing assembly 10 according to an exemplary embodiment. Further, FIG. 2 is a perspective view of the fixing assembly 10, and FIG. 3 is a perspective view of a holding jig 12. Further, FIG. 4 is a side view of a fixture 14, FIG. 5 is a front view of the fixture 14, FIG. 6 is a sectional view of the fixing assembly 10 taken along a line A-A in FIG. 5, and FIG. 7 is a sectional view taken along a line B-B in FIG. 6. Further, in the following description, in order to facilitate the description, a longitudinal direction of the holding jig 12 is referred to as an "X-direction," a short direction thereof is referred to as a "Y-direction," and a direction perpendicular to the X-direction and the Y-direction is referred to as a "Z-direction."

The fixing assembly 10 of the present embodiment fixes, to a motor case 104 as a base member, three power lines 16 connected to a three-phase rotary electric machine 100. Ahead of a description of the fixing assembly 10, the power line 16 is described briefly. As is generally known, the power line 16 is a cable for connecting a stator coil 102 to an external power source (not shown). One end of the power line 16 is welded to the stator coil 102, and a power-line-side terminal 18 is connected to the other end the power line 16. The power-line-side terminal 18 is a sheet metal member made of metal having conductivity, and includes an insertion hole 18a through which a fastening bolt 108 is inserted, and a caulking portion 18b to which the other end of the power line 16 is caulked to be connected. A terminal block 106 is attached to the motor case 104, and the terminal block 106 is provided with a plurality of bus bars electrically connected to an external power source. The power-line-side terminal 18 is threadedly engaged to the bus bar with the fastening bolt 108 in a fastening manner, so as to be electrically connected to the bus bar and to the external power source.

The fixing assembly 10 is configured to hold intermediate parts of the three power lines 16 (between respective ends of the stator coils 102 and the terminal block 106) so as to fix them to the motor case 104. The fixing assembly 10 includes a holding jig 12 and a fixture 14. As illustrated in FIG. 3, the holding jig 12 holds the three power lines 16 so as to restrict a relative movement between the three power lines 16. The holding jig 12 is made of insulating resin and has a generally rectangular solid shape. The holding jig 12 has three insertion holes 20 configured such that the three power lines 16 are inserted therethrough, respectively. The three insertion holes 20 are arranged at intervals in the X-direction (a longitudinal direction of the holding jig 12). When the power lines 16 are inserted through the insertion holes 20, a relative positional relationship (an adjacent distance) between the three power lines 16 is fixed. Note that, in the present embodiment, as illustrated in FIG. 6, the power line 16 has a generally rectangular section inside the insertion hole 20.

Further, the holding jig 12 also has two fitted portions 22. The fitted portion 22 is a part to be fitted to a fitting portion 40 provided in the after-mentioned fixture 14. In the present embodiment, the fitted portion 22 is a recessed portion provided on a top face of the holding jig 12. One fitted portion 22 (recessed portion) is provided between the insertion hole 20 and the insertion hole 20, and has a section having a generally rectangular shape elongated in the X-direction.

The fixture 14 is a member for fixing, to the motor case 104, the holding jig 12 that holds the power lines 16. The fixture 14 is externally mountable by one-touch action to the holding jig 12 that holds the power lines 16. More specifically, the fixture 14 is a generally block-shaped member having an accommodation space 24 (see FIG. 4) for the holding jig 12. The accommodation space 24 is formed in a bottom part of the fixture 14. The fixture 14 includes a fastening portion fastened to the motor case 104, and a mounting portion on which the holding jig 12 is mountable. The fastening portion includes a fastening hole 30 provided near one end of the fixture 14 in the Y-direction in a penetrating manner in the Z-direction; and a fastening pin 32 provided near the fastening hole 30 so as to project downward in the Z-direction. The fixture 14 is threadedly engaged to the motor case 104 in a fastening manner by a fastening bolt inserted through the fastening hole 30. Further, at the time of threadedly engaging and fastening the fixture 14, the fastening pin 32 provided in the fixture 14 is inserted into a pin hole provided in the motor case 104. The fastening pin prevents a rotation of the fixture 14 around the fastening bolt and prevents looseness of the fastening bolt.

The mounting portion includes the accommodation space 24 which accommodates the holding jig 12; an outer holding pawl 26o and an inner holding pawl 26i that sandwich the holding jig 12; the fitting portion 40 fitted to the fitted portion 22 of the holding jig 12. Note that, in the following description, in a case where the outer holding pawl 26o and the inner holding pawl 26i are not distinguished from each other, additional characters i, o are omitted, and they are just referred to as the "holding pawl 26."

The accommodation space 24 is a space, a bottom part of which is completely opened, and has a size and a shape corresponding to the holding jig 12. Accordingly, the accommodation space 24 has a generally rectangular solid shape elongated in the X-direction. A plurality of holding pawls 26 is provided on both sides in the Y-direction (both sides in the short direction) across the accommodation space 24. The holding pawls 26 are roughly classified into the outer holding pawl 26o provided on an opposite side to the fastening hole 30 across the accommodation space 24, and the inner holding pawl 26i provided on a bolt-hole side across the accommodation space 24. The outer holding pawl 26o is a pawl extending in the Z-direction on the other side of the fixture 14 in the Y-direction (an end on an opposite side to the fastening hole 30). Two outer holding pawls 26o are provided at an interval in the X-direction. Further, the inner holding pawl 26i is a pawl extending in the Z-direction on a side opposite to the outer holding pawl 26o across the accommodation space 24. Two inner holding pawls 26i are provided at an interval in the X-direction. As illustrated in FIG. 7, the holding jig 12 is inserted between the inner holding pawl 26i and the outer holding pawl 26o so as to be sandwiched by the inner holding pawl 26i and the outer holding pawl 26o.

Figure 8A:
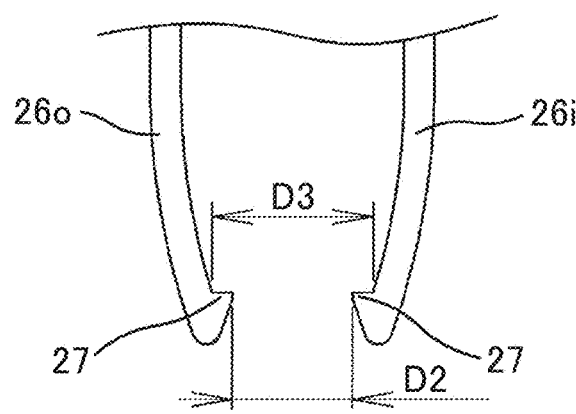
FIG. 8A is a schematic view to describe a holding pawl.
Figure 8B:
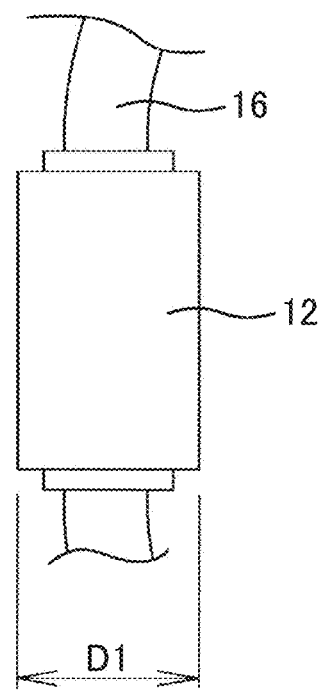
FIG. 8B is a schematic view to describe the holding jig.

Here, a shape of the holding pawl 26 will be described with reference to FIG. 8A. FIG. 8A and FIG. 8B are a view schematically illustrating the holding pawls 26 and the holding jig 12. As illustrated in FIGS. 7, 8A, and 8B, the outer holding pawl 26o and the inner holding pawl 26i each have a barb portion 27 provided in a distal end (a lower end) thereof so as to project inwardly. Further, the holding pawl 26 elongated in the Z-direction has a property like a leaf spring having elasticity in a swinging manner in the Y-direction. Further, the holding pawl 26 has a gentle arc shape that is formed to bend slightly inward toward its distal end in a course of molding. Note that, this bending is emphasized in FIG. 8A so as to facilitate understanding, but the bending is smaller in practice.

In an unloaded state, a distance D2 between the barb portion 27 of the inner holding pawl 26i and the barb portion 27 of the outer holding pawl 26o is sufficiently smaller than a thickness D1 of the holding jig 12. Accordingly, at the time when the holding jig 12 is inserted into the accommodation space 24, the holding pawls 26 are bent by elastic deformation so as to enlarge the distance D2. Further, when the holding jig 12 is completely accommodated inside the accommodation space 24, the distance D2 becomes smaller than the thickness D1 of the holding jig 12 due to elastic restoration of the holding pawls 26. As a result, the barb portion 27 support a bottom face of the holding jig 12 so as to prevent the holding jig 12 from falling. Further, a distance D3 between the inner holding pawl 26i and the outer holding pawl 26o is slightly smaller than the thickness D1 of the holding jig 12. Accordingly, when the holding jig 12 is accommodated in the accommodation space 24, the inner holding pawl 26i and the outer holding pawl 26o elastically deform so as to expand outwardly in the Y-direction according to the thickness D1 of the holding jig 12, and sandwich the holding jig 12 due to an elastic restoring force. The holding jig 12 is sandwiched by the holding pawls 26 due to this elastic restoring force, thereby restricting its movement in the Y-direction.

The mounting portion is further provided with three guide pawls 28. The three guide pawls 28 are arranged at intervals in the X-direction, and the outer holding pawl 26o is provided between the guide pawl 28 and the guide pawl 28. Similarly to the outer holding pawl 26o, the guide pawl 28 is a thin-plate part extending in the Z-direction, but the guide pawl 28 is longer than the outer holding pawl 26o and does not include the barb portion 27. The guide pawl 28 is also elongated in the Z-direction and has elasticity in a swinging manner in the Y-direction, so as to have a property like a leaf spring. Similarly to the holding pawl 26, the guide pawl 28 and a wall 29 positioned on a side opposite thereto across the accommodation space 24 sandwich the holding jig 12 in a cooperative manner. Further, the guide pawl 28 not provided with the barb portion 27 functions as a guide that guides the holding jig 12 to the accommodation space 24.

That is, in general, when the holding jig 12 is mounted on the fixture 14, the holding jig 12 is inserted into the accommodation space 24 such that the fixture 14 covers the holding jig 12 from above. At this time, it is hard to see, from above, the distal end of the holding pawl 26, which is relatively short, so it is difficult to adjust a relative positional relationship between the holding pawl 26 and the holding jig 12. However, it is relatively easy to see a distal end of the guide pawl 28, which is longer than holding pawl 26, from above the fixture 14. As a result, a position of the holding jig 12 can be easily guided to an appropriate position. Further, since the guide pawl 28 does not include the barb portion 27, a gap between the guide pawl 28 and the wall 29 is large, so the holding jig 12 can be easily inserted into the gap. The holding jig 12 inserted between the guide pawl 28 and the wall 29 moves along the guide pawl 28, so that the holding jig 12 is guided to the accommodation space 24. That is, by providing the guide pawls 28, it is easy to estimate a position of the holding jig 12 with respect to the fixture 14, and further, it is easy to specify a moving direction of the holding jig 12 at the time of insertion. As a result, it is possible to easily perform a mounting operation of the holding jig 12 on the fixture 14.

Here, as apparent from FIG. 6, in the present embodiment, X-direction positions of the inner holding pawl 26$i$ and the outer holding pawl 26$o$ are displaced from each other. This is to disperse compressive-stress application parts in the holding jig 12. That is, when the holding jig 12 is mounted on the fixture 14, the holding jig 12 receives a compressive stress from the holding pawl 26. In a case where the inner holding pawl 26$i$ and the outer holding pawl 26$o$ are placed at the same X-direction position, the compressive stress is intensively applied at a specific X-direction position. As a result, a load to the holding jig 12 is increased, which causes deterioration or the like of the holding jig 12. In order to avoid such a problem, in the present embodiment, the holding pawls 26 are placed at different X-direction positions (positions in the longitudinal direction of the accommodation space 24).

Further, in the present embodiment, a plurality of (two) inner holding pawls 26$i$ and a plurality of (two) outer holding pawls 26$o$ are provided. Since the plurality of holding pawls 26 is provided on opposite sides across the accommodation space 24 as such, even if a rotational force or a torsional force in an XY plane is applied to the holding jig 12, it is hard to cause a movement of the holding jig 12 with respect to the fixture 14, thereby resulting in that the holding jig 12 is more stably fixed.

Further, in the present embodiment, a plurality of holding pawls 26 and a plurality of guide pawls 28 are provided. Since the plurality of pawls 26, 28 is provided as such, even if a curve or a sink mark occurs in some of the pawls 26, 28 at the time of molding and sandwiching performance deteriorates, the holding jig 12 can be sandwiched by the other pawls 26, 28. As a result, it is possible to reduce variations in sandwiching performance as the whole fixture 14, thereby making it possible to more stably hold the holding jig 12.

As illustrated in FIGS. 4, 7, two fitting portions 40 configured to be fitted to the fitted portions 22 of the holding jig 12 are provided on an upper face of the accommodation space 24. In the present embodiment, since the fitted portion 22 is a recessed portion, the fitting portion 40 is a rib (projection) fitted to the recessed portion. When the holding jig 12 is accommodated in the accommodation space 24, the fitting portion 40 is fitted to the fitted portion 22, so that a contact area between the holding jig 12 and the fixture 14 increases, thereby making it possible to intensive application of a stress to a specific part of the holding jig 12. As a result, it is possible to effectively prevent deterioration or the like of the holding jig 12.

Further, by providing the fitting portions 40, it is possible to restrict a movement of the holding jig 12 in the Y-direction. The movement of the holding jig 12 in the Y-direction cannot be sufficiently restricted by the holding pawls 26. That is, a fitting degree between the holding pawls 26 and the holding jig 12 in the X-direction is high, but a fitting degree therebetween in the Y-direction is low. Accordingly, only by the holding pawls 26, it is difficult to sufficiently restrict the movement of the holding jig 12 in the Y-direction. In view of this, in the present embodiment, the fitting portion 40 to be fitted to the fitted portion 22 of the holding jig 12 is provided, so as to restrict the movement of the holding jig 12 in the Y-direction as well. A fitting degree between the fitting portion 40 and the fitted portion 22 in the Y-direction is high, but a fitting degree therebetween in the X-direction is low. Since the fitting degree in the X-direction is set to be low, it is possible to relatively easily fit the fitted portion 22 to the fitting portion 40.

Here, in the present embodiment, two fitting portions 40 are provided, but the two fitting portions 40 have different fitting degrees. That is, as illustrated in FIG. 6, when a fitting portion 40 relatively closer to the fastening hole 30 is referred to as a "main fitting portion 40$m$," and the other fitting portion 40 is referred to as a "secondary fitting portion 40$s$," a fitting degree between the secondary fitting portion 40$s$ and the fitted portion 22 is lower than a fitting degree between the main fitting portion 40$m$ and the fitted portion 22. In the present embodiment, even if some dimension errors occur due to a curve, a sink mark, or the like in a course of molding, it is possible to absorb the errors by a low fitting degree between the secondary fitting portion 40$s$ and the fitted portion 22. As a result, it is possible to prevent a decrease in an assembly property of the fixture 14 to the holding jig 12.

Here, as illustrated in FIG. 3, the power lines 16 project from a top face of the holding jig 12 that holds the power lines 16. In order to avoid interference between the power lines 16 and the fixture 14, grooves 42 for individually accommodating the power lines 16 are also formed in the fixture 14, as illustrated in FIG. 6. A wall 44 made of resin is provided between the groove 42 and the groove 42. The wall 44 functions as an insulating wall that secures insulation between the power line 16 and the power line 16. Since the insulating wall 44 is provided, insulation between the power lines 16 is better secured. That is, in a case where the fixture 14 is externally mounted on the holding jig 12 like the present embodiment, a coating of the power line 16 might be damaged due to impact or the like caused at the time of the mounting. However, since the insulating wall is provided between the power lines 16, even if the coating of the power line 16 is damaged, it is possible to surely insulate the power lines 16 from each other.

Figure 9:
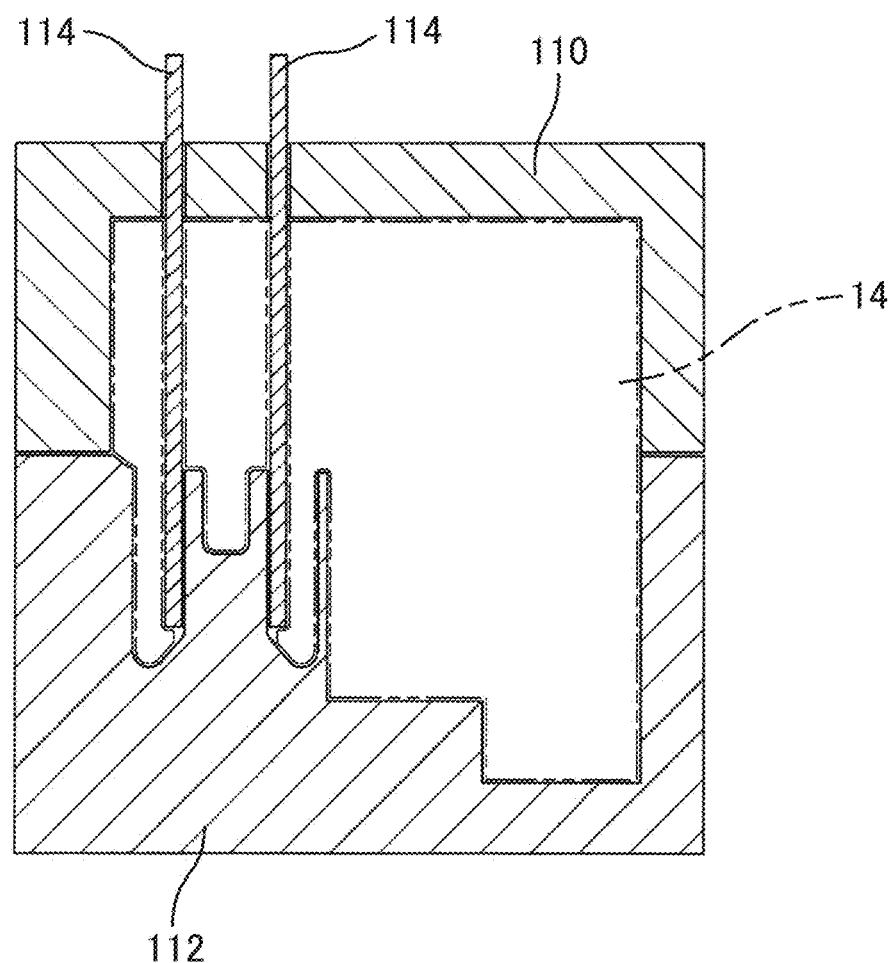
FIG. 9 is a view illustrating one example of a die to be used for molding of the holding jig.

Here, as illustrated in FIG. 2, generally square U-shaped through-holes 36 are formed in the fixture 14 at positions right above the holding pawls 26. A reason to provide the through-holes 36 is described with reference to FIG. 9. FIG. 9 is a view illustrating one example of dies 110,112,114 used for molding the fixture 14. In FIG. 9, an alternate long and two short dashes line indicates a shape of the fixture 14 molded by the dies 110, 112, 114. The fixture 14 of the present embodiment is formed by injection molding using the upper die 110 and the lower die 112 as illustrated in FIG. 9. However, an under-cut shape such as the barb portion 27 of the holding pawl 26 cannot be molded only by the upper die 110 and the lower die 112, and a core 114 is required. Here, when a shape of the barb portion 27 is molded, the core 114 may be assumed to have a flat shape with a thickness corresponding to a projecting amount of the barb portion 27. However, the core 114 has a very thin thickness relative to a length. Therefore, in a case where the core 114 is a simple flat plate, a problem with accuracy (curve) and strength easily occurs. If the core 114 is thickened more than necessary, it is possible to secure the accuracy and strength of the core 114. However, in that case, the through-hole 36 formed in the fixture 14 becomes large, which affects the strength of the fixture 14.

Accordingly, in the present embodiment, by forming the core 114 to have a square U-shaped section, the through-hole 36 is kept small and a curve of the core 114 is reduced. Further, the strength of the core 114 is improved. By use of the core 114, the generally square U-shaped through-hole 36 is formed in the molded fixture 14 at a position right above the holding pawl 26. Here, since the through-hole 36 is positioned right above the holding pawl 26, when the through-hole 36 is looked through from above, the vicinity of the barb portion around 27 of the holding pawl 26 can be visually observed. Accordingly, the through-hole 36 is usable to visual check of an engaged state between the holding pawl 26 and the holding jig 12.

Next will be described a flow of fixation (assembly) of the power lines 16 by use of such a fixing assembly 10. When the power lines 16 are fixed, an unconnected power line 16, which is not connected to the stator coil 102 or the terminal block 106, is assembled to the holding jig 12 first. More specifically, for example, the unconnected power line 16 is inserted through the insertion hole 20 of the holding jig 12, and then, both ends of the insertion hole 20 is subjected to heat caulking or the like, thereby preventing falling-off of the power line 16. Further, another example may be such that three power lines 16 are positioned inside a die for the holding jig 12, and in that state, resin is injected into the die so as to mold the holding jig 12 and fix the power lines 16 by resin molding.

When the three power lines 16 are held by the holding jig 12, each of the power lines 16 is connected to a corresponding stator coil 102 and a corresponding bus bar of the terminal block 106. That is, a connection operation of the power lines 16 is performed in a state where the fixture 14 is not attached to the holding jig 12. On this account, in comparison with a case of performing the connection operation in a state where the fixture 14 is attached, a load to the power lines 16 is small, so the power lines 16 can be easily handled.

When the power lines 16 are connected to the stator coils 102 and the terminal block 106, the fixture 14 is then mounted on the holding jig 12, if necessary. Note that, depending on a vehicle in which the rotary electric machine 100 is provided or a type of the rotary electric machine 100, the fixture 14 often becomes needless. That is, in the present embodiment, in a case where the power lines 16 can be relatively shortened or an effect of vibration is expected to be small, it is not necessary to fix the holding jig 12 to the motor case 104. In this case, it is not necessary to mount the fixture 14 on the holding jig 12.

In the meantime, in a case where the power lines 16 are long to some extent, and further, an effect of vibration is expected to some extent, it is preferable to fix the holding jig 12 to the motor case 104. This is because, when the power line 16 vibrates, a stress is applied to a welded portion between the power line 16 and the stator coil 102 or a connection portion (the caulking portion 18b) between the power line 16 and the power-line-side terminal 18, which may cause deterioration of the welded portion or the caulking portion 18b. Accordingly, in such a case, the fixture 14 is externally mounted on the holding jig 12, and the holding jig 12 is fixed to the motor case 104 via the fixture 14.

More specifically, the fixture 14 is put on the holding jig 12 from above, and the holding jig 12 is inserted into the accommodation space 24. While the holding jig 12 is sandwiched between the holding pawls 26, a bottom end of the holding jig 12 is locked to the barb portions 27 of the holding pawls 26. Further, at the same time, the fitting portions 40 of the fixture 14 are fitted to the fitted portions 22 of the holding jig 12. Hereby, the holding jig 12 is mounted on the fixture 14. After that, the fastening pin 32 of the fixture 14 is inserted into a pin hole of the motor case 104 and the fixture 14 is threadedly engaged to the motor case 104 in a fastening manner by use of a fastening bolt. Hereby, the holding jig 12 that holds the power lines 16 is fixed to the motor case 104, thereby restricting a movement of the holding jig 12, eventually, movements of the power lines 16. As a result, it is possible to reduce a stress to be applied to the welded portion or the caulking portion 18b.

As apparent from the above description, in the present embodiment, the fixture 14 for fixing the holding jig 12 to the motor case 104 is externally mounted on the holding jig 12. Accordingly, the connection operation or the like between the power line 16 and the stator coil 102 and between the power line 16 and the terminal block 106 can be performed in a state where the fixture 14 is not provided and the power lines 16 can be easily handled. As a result, it is possible to prevent a decrease in connection workability of the power lines. Further, the fixture 14 is externally mountable. Accordingly, in a case of a type of a vehicle or the rotary electric machine 100 that does not require the fixation of the holding jig 12, the fixture 14 can be omitted. As a result, it is possible to select an appropriate configuration depending on the type of the vehicle or the type of the rotary electric machine 100.

Note that the configuration described so far is an example, and the other configurations may be modified appropriately, provided that at least the fixture 14 that is externally mountable on the holding jig 12 holding the power lines 16 is provided. For example, the fixture 14 is not limited to a configuration in which the fixture 14 is mounted on the holding jig 12 by sandwiching by the holding pawls 26, but may be mounted on the holding jig 12 by other measures. For example, a hole corresponding to the holding jig 12 may be formed in the fixture 14, so that the holding jig 12 is pressed into the hole. Note that, in consideration of workability, it is desirable that the fixture 14 be mountable on the holding jig 12 by one-touch action. Here, to "be mountable by one-touch action" indicates that the fixture 14 is mountable only by one action without using a special jig or the like. For example, example types of the one action include "press," "insert," "turn," and "pull". Further, if sufficient retentivity is obtained only by the holding pawls 26, the fitting portions 40 may be omitted. Further, in the present embodiment, the fitting portion 40 is a projection portion and the fitted portion 22 is a recessed portion, but these portions may be configured reversely. Further, the base member to which the fixture 14 is attached is not limited to the motor case, but may be a stator core or the like of the rotary electric machine 100.

What is claimed is:

1. A fixture for fixing a holding jig to a base member, the holding jig being configured to hold a plurality of power lines connected to respective stator coils and to restrict a relative movement between the power lines, the fixture comprising:
   a fastening portion configured to be fastened to the base member; and
   a mounting portion on which the holding jig is mounted, wherein
   the mounting portion defines an accommodation space configured to accommodate the holding jig, the mounting portion including holding pawls,
   the holding pawls are provided on both sides of the mounting portion across the accommodating space in at least one of a first direction and a second direction, and the holding pawls are configured to sandwich the holding jig accommodated in the accommodation space therebetween,
   the mounting portion further includes a fitting portion formed as either one of a projection portion and a recessed portion,
   the fitting portion is configured to be fitted to a fitted portion that is provided in the holding jig and is formed as a projection portion or a recessed portion so as to correspond to the fitting portion,
   in the first direction, a fitting degree between the fitting portion and the fitted portion is higher than a fitting degree between the holding pawls and the holding jig; and
   in the second direction, the fitting degree between the holding pawls and the holding jig is higher than the fitting degree between the fitting portion and the fitted portion.

2. The fixture according to claim 1, wherein
   the holding pawls are configured such that a plurality of holding pawls are provided on either side of the mounting portion across the accommodating space in the first direction,
   the first direction is perpendicular to the second direction, and
   a length of the accommodation space in the first direction is shorter than a length of the accommodation space in the second direction.

3. The fixture according to claim 1, wherein
   the mounting portion further includes guide pawls;
   the guide pawls extend parallel to the holding pawls and are longer than the holding pawls, and
   the guide pawls are configured to guide the holding jig into the accommodation space.

4. The fixture according to claim 1, wherein
   the holding pawls are provided at different positions in the second direction of the accommodation space.

5. The fixture according to claim 1, wherein:
   the mounting portion includes a plurality of the fitting portions; and
   a fitting degree of a main fitting portion, the main fitting portion is a fitting portion closer to the fastening portion among the more fitting portions, is higher than a fitting degree of a secondary fitting portion, which is the other fitting portion among the more fitting portions.

6. The fixture according to claim 1, wherein:
   the fixture includes a plurality of through-holes,
   the plurality of through-holes are positioned directly above respective barb portions of the holding pawls, each of the plurality of through-holes has a generally square U-shaped section; and
   the barb portions of the holding pawls are provided in respective distal ends of the holding pawls and project inwardly in the accommodation space.

7. The fixture according to claim 1, wherein:
   the fixture further includes an insulating wall; and
   the insulating wall is configured to be provided between each of the power lines that project from the holding jig mounted on the mounting portion.

8. A fixing assembly for fixing, to a base member, a plurality of power lines connected to respective stator coils, the fixing assembly comprising:
   a holding jig configured to hold the plurality of power lines and to restrict a relative movement between the power lines; and
   a fixture including:
     a fastening portion to be fastened to the base member, and
     a mounting portion configured for mounting the holding jig thereon,
   wherein:
   the mounting portion defines an accommodation space configured to accommodate the holding jig, the mounting portion including holding pawls,
   the holding pawls are provided on both sides of the mounting portion across the accommodating space in at least one of a first direction and a second direction, and the holding pawls are configured to sandwich the holding jig accommodated in the accommodation space therebetween,
   the mounting portion further includes a fitting portion formed as either one of a projection portion and a recessed portion,
   the fitting portion is configured to be fitted to a fitted portion that is provided in the holding jig and is formed as a projection portion or a recessed portion so as to correspond to the fitting portion,
   in the first direction, a fitting degree between the fitting portion and the fitted portion is higher than a fitting degree between the holding pawls and the holding jig; and
   in the second direction, the fitting degree between the holding pawls and the holding jig is higher than the fitting degree between the fitting portion and the fitted portion.

9. The fixing assembly according to claim 8, wherein:
   the fixture further includes an insulating wall; and
   the insulating wall is configured to be provided between each of the plurality of power lines that project from the holding jig mounted on the mounting portion.

10. The fixing assembly according to claim 8, wherein:
    the fixture includes a plurality of through-holes,
    the plurality of through-holes are positioned directly above respective barb portions of the holding pawls, each of the plurality of through-holes has a generally square U-shaped section; and
    the barb portions of the holding pawls are provided in respective distal ends of the holding pawls and project inwardly in the accommodation space.

* * * * *